(12) United States Patent
Mochizuki et al.

(10) Patent No.: US 7,475,470 B2
(45) Date of Patent: Jan. 13, 2009

(54) METHOD FOR MANUFACTURING A MAGNETIC HEAD FOR PERPENDICULAR RECORDING

(75) Inventors: Masafumi Mochizuki, Kokubunji (JP); Tomohiro Okada, Enschede (NL); Atsushi Nakamura, Kodaira (JP)

(73) Assignee: Hitachi Global Storage Technologies, LTD., Odawara-shi (JP)

( * ) Notice: Subject to any disclaimer, the term of this patent is extended or adjusted under 35 U.S.C. 154(b) by 293 days.

(21) Appl. No.: 10/774,370

(22) Filed: Feb. 10, 2004

(65) Prior Publication Data

US 2004/0156142 A1 Aug. 12, 2004

Related U.S. Application Data

(62) Division of application No. 10/046,973, filed on Jan. 17, 2002, now Pat. No. 6,741,421.

(30) Foreign Application Priority Data

Mar. 19, 2001 (JP) ............................. 2001-077419

(51) Int. Cl.
*G11B 5/187* (2006.01)
(52) U.S. Cl. .............. 29/603.15; 29/603.18; 29/603.16; 204/192.34; 216/41; 216/47; 360/122
(58) Field of Classification Search .............. 29/603.13, 29/603.15, 603.18, 603.16, 603.07; 423/324; 204/192.34; 360/122, 125, 126; 216/41, 216/47
See application file for complete search history.

(56) References Cited

U.S. PATENT DOCUMENTS

| | | | | |
|---|---|---|---|---|
| 4,807,073 | A | * | 2/1989 | Takeura et al. .......... 360/125 X |
| 5,326,429 | A | * | 7/1994 | Cohen et al. .............. 216/47 X |
| 5,396,391 | A | | 3/1995 | Tanaka et al. |
| 5,495,379 | A | | 2/1996 | McNeil et al. |
| 5,604,973 | A | * | 2/1997 | Gaud et al. .............. 29/603.15 |
| 5,805,392 | A | * | 9/1998 | Mallary et al. .......... 360/126 X |
| 5,995,341 | A | | 11/1999 | Tanaka et al. |
| 6,081,408 | A | * | 6/2000 | Partee ................. 29/603.15 X |
| 6,504,675 | B1 | | 1/2003 | Shukh et al. |

FOREIGN PATENT DOCUMENTS

| | | | |
|---|---|---|---|
| JP | 58-121124 | * | 7/1983 |
| JP | 59-079416 | | 5/1984 |
| JP | 11-213334 | | 8/1999 |

* cited by examiner

*Primary Examiner*—A. Dexter Tugbang
(74) *Attorney, Agent, or Firm*—Mattingly, Stanger, Malur & Brundidge, P.C.

(57) ABSTRACT

On the trailing side of a main pole air bearing surface of a magnetic head for perpendicular recording, the central portion is formed closer to the leading side than the corners on the trailing side, such that the main pole air bearing surface is formed in the shape of a recess with respect to the tailing side. As a result, it is possible to linearize the magnetic field distribution on the trailing side whereby the magnetic reversal is determined, and to record a bit without curving the shape of magnetic reversal.

3 Claims, 11 Drawing Sheets

PRIOR ART

FIG. 2(A)

CONTOURS OF PERPENDICULAR COMPONENT OF WRITE FIELD GENERATED FROM A SINGLE POLE TYPE HEAD

CONTOURS OF PERPENDICULAR COMPONENT OF WRITE FIELD GENERATED FROM A SINGLE POLE TYPE HEAD

DISK ROTATING DIRECTION 17

DISK RADIATION DIRECTION 23

FIG. 9(A) FORMING A RESIST PATTERN

FIG. 9(B) ETCHING THE INORGANIC INSULATING

FIG. 9(C) REMOVING THE RESIST PATTERN

FIG. 9(D) FORMING A STOPPER LAYER

FIG. 9(E) FORMING A MAGNETIC LAYER

FIG. 9(F) POLISHING TO FLATTEN THE MAGNETIC LAYER

FIG. 9(G) FORMING A HOLLOW OF MAGNETIC LAYER

FIG. 10(A) FORMING A RESIST PATTERN

FIG. 10(B) ETCHING AN INORGANIC INSULATING

FIG. 10(C) REMOVING THE RESIST PATTERN

FIG. 10(D) FORMING A STOPPER LAYER

FIG. 10(E) FORMING A MAGNETIC LAYER

FIG. 10(F) POLISHING TO FLATTEN THE MAGNETIC LAYER

FIG. 10(G) FORMING A HOLLOW OF MAGNETIC LAYER

FIG. 11(A)
FORMING A RESIST PATTERN

FIG. 11(B)
FORMING A MAGNETIC LAYER

FIG. 11(C)
REMOVING THE RESIST PATTERN

FIG. 11(D)
FORMING A HOLLOW OF MAGNETIC LAYER

FIG. 12
IN CASE OF A SHALLOW HOLLOW (H=10nm)

CONTOURS OF PERPENDICULAR COMPONENT OF WRITE
FIELD GENERATED FROM A SINGLE POLE TYPE HEAD

FIG. 13
IN CASE OF A DEEP HOLLOW (H=200nm)

METHOD FOR MANUFACTURING A MAGNETIC HEAD FOR PERPENDICULAR RECORDING

This is a divisional application of U.S. Ser. No. 10/046,973, filed Jan. 17, 2002, now U.S. Pat. No. 6,741,421.

BACKGROUND OF THE INVENTION

1. Field of the Invention

The present invention relates to a magnetic head for perpendicular recording and a method for manufacturing the same, and a magnetic disk storage apparatus mounting the magnetic head for perpendicular recording.

2. Description of the Related Art

In a magnetic disk storage apparatus, the data on a recording medium is read and written by a magnetic head. The areal recording density is required to be increased in order to increase the recording capacity per unit area of the magnetic disk. However, with a current longitudinal recording method, there occurs a problem as follows. As the length of a bit to be recorded decreases, thermal fluctuation of the magnetization of the medium becomes a serious problem which restricts the limit of the areal recording density. There is a perpendicular recording method for recording a magnetization signal in a direction perpendicular to the medium for solving this problem.

There are two types of perpendicular recording methods: a method in which a double layered perpendicular medium having a soft magnetic underlayer is used as a recording medium; and a method in which a single layered perpendicular medium having no underlayer is used. When the double layered perpendicular medium is used as the recording medium, recording is usually performed by using a so-called single pole type head having a main pole and an auxiliary pole.

Figure 2A:
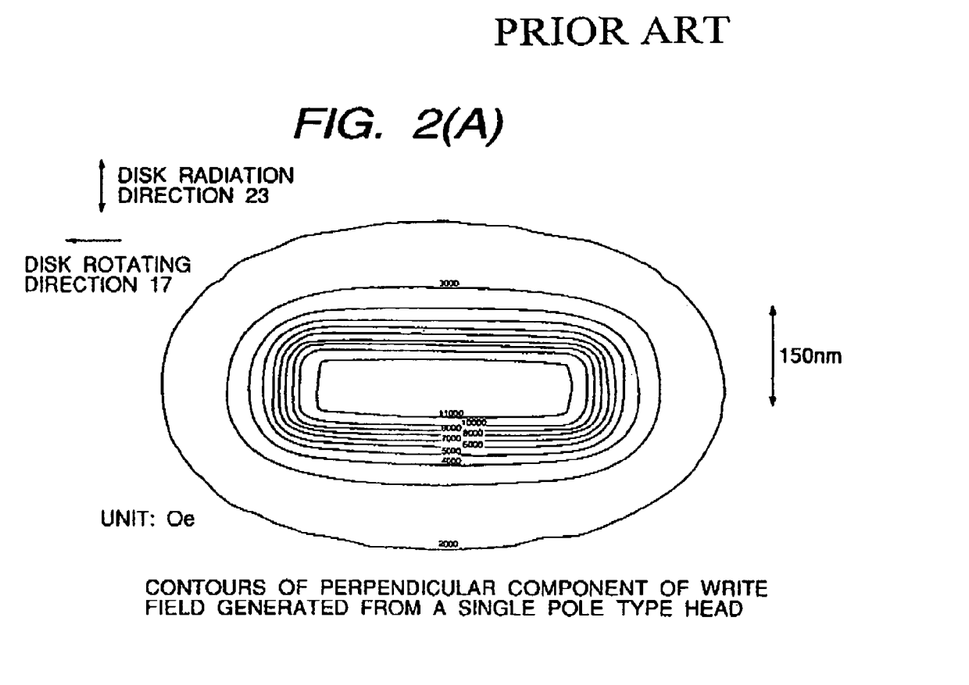

Further, in order to improve the recording density, the track density and the linear recording density are required to be improved also for perpendicular recording. In order to improve the track density, the track width of the magnetic head is required to be increased in fineness and precision. When perpendicular magnetic recording using the double layered perpendicular medium and the single pole type head is performed, the distribution of the write field generated from the magnetic pole of the single pole type head is largely different from that of the longitudinal magnetic recording. For example, as shown in FIG. 2(A), the contours of the perpendicular component of the write head field intensity are distributed concentrically wherein the maximum intensity occurs from the central portion of the main pole, and exhibit such a distribution that a contour closer to the outside has a more swollen shape. Therefore, the shape of the air bearing surface of the main pole largely affects the recorded magnetization pattern of the medium.

Figure 2B:
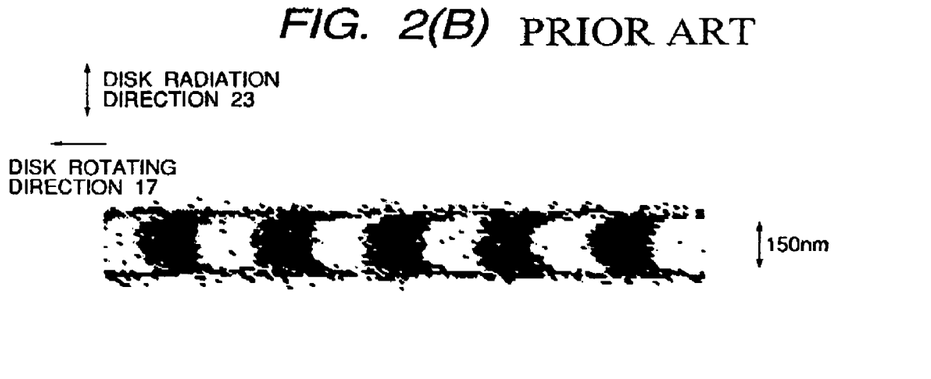
FIG. 2(B) is a diagram for illustrating the recorded magnetization state, due to a combination of a prior-art single pole type head and a double layered recording medium having an underlayer (wherein the scaling factor is not constant)

FIG. 2(A) is a distribution diagram of the contours of perpendicular components of head write field in the form of a main pole in the prior art obtained by simulation. FIG. 2(A) indicates that the field distribution is curved toward the trailing side. Herein, the trailing side denotes the downstream side of the disk rotating direction, and it denotes the direction of the arrow indicated as "disk rotating direction 17" in FIG. 2(A). In contrast, the upstream side of the disk rotating direction is referred to as a leading side. FIG. 2(B) is a diagram showing the magnetization configuration, obtained from simulation, recorded on the medium when a head having such a magnetic field distribution is used. As indicated from FIG. 2(B), the magnetic reversal position in the track central portion is situated more toward the disk rotating direction than in each of the track edge portions, so that the shape of magnetic transition of the medium is curved. Such a phenomenon actually becomes apparent from the observation result by means of a MFM: magnetic force microscopy.

SUMMARY OF THE INVENTION

If the shape of magnetic reversal of a medium is curved to the track direction as shown in FIG. 2(B) there occur problems as follows: when reading is carried out by means of a MR/GMR head or the like, the magnetic transition length appears to be large, so that the half-width of an isolated pulse is increased, and at the same time, the recording track width seems to be reduced with an increase in linear recording density. These problems are large hindrances in implementing high density recording.

The present invention provides a magnetic head for perpendicular recording, which is capable of recording a bit in which the degree of curvature of the shape of magnetic transition has been reduced, a manufacturing method thereof, and a magnetic disk storage apparatus mounting the magnetic head for perpendicular recording.

In the present invention, a recess, that is, a hollow is formed on the downstream side of the direction of rotation of the magnetic recording medium, that is, on the trailing side of a main pole of a single pole type head for perpendicular recording.

As for the write field intensity generated from the main pole, the contours thereof are distributed concentrically, wherein the intensity from the central portion of the main pole is maximum. However, it is considered that the shape of recorded magnetic reversal to be recorded on the recording medium is determined by reflecting the shape of the contour at which the write field intensity becomes equal to the coercive force of the recording medium. Therefore, the shape of the air bearing surface of the main pole affects the write field intensity distribution.

As the prior art in which the pole shape of the head has been changed, in Japanese Published Unexamined Patent Application No. Hei 11-213334, there is disclosed a head for in-plane recording in which projections are provided on the leading side of an upper magnetic pole opposed to a common magnetic pole with a gap interposed therebetween, thereby to reduce the expansion of a write field in the track width direction. However, the technology described in Japanese Published Unexamined Patent Application No. Hei 11-213334 is the technology for improving the shape of the write field in the track width direction. Therefore, even if the technology described in Japanese Published Unexamined Patent Application No. Hei 11-213334 is simply converted for perpendicular recording, it is not possible to improve the curvature of the shape of magnetic transition of a medium in the track direction.

The inventors of the present invention have found the following fact. Namely, if the trailing side of the air bearing surface of a main pole is shaped in the form of a recess, it is possible to more linearize the magnetic field distribution whereby the magnetic transition is determined. By using a single pole type head having such a main pole shape, it is possible to reduce the degree of curvature of the shape of magnetic transition. In consequence, it is possible to reduce the following problems: when reading is performed by means of a reading head, the magnetic transition length appears to be large, so that the half-width of an isolated pulse seems to be reduced, and at the same time, the recording track width is narrowed with an increase in linear recording density. Further, it is possible to provide a magnetic disk storage apparatus having a more improved track density than ever by mounting such a single pole type head therein.

BRIEF DESCRIPTION OF THE DRAWINGS

FIGS. 1(A) and 1(B) are plan views as seen from the air bearing surface of a single pole type head in accordance with the present invention, wherein FIG. 1(A) shows the overall configuration, and FIG. 1(B) is a diagram showing a portion of a main pole on an enlarged scale (wherein the scaling factor is not constant);

FIG. 2(A) shows the distribution of the contours of perpendicular components of head write field.

FIG. 6(A) shows the distribution of the contours of perpendicular components of write head field.

DETAILED DESCRIPTION OF THE PREFERRED EMBODIMENTS

EXAMPLE 1

Figures 3A, 3B:
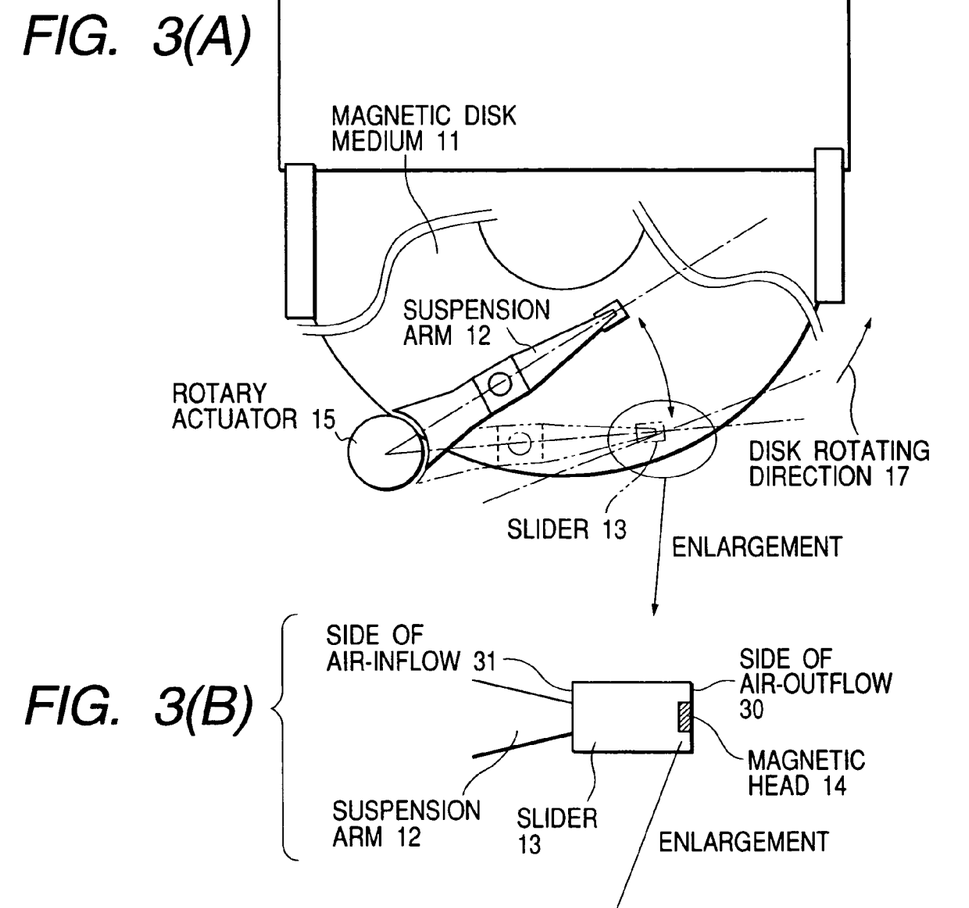
FIGS. 3(A) to 3(C) are schematic diagrams of a magnetic disk storage apparatus in each embodiment of the present invention (wherein the scaling factor is not constant)
Figure 3C:
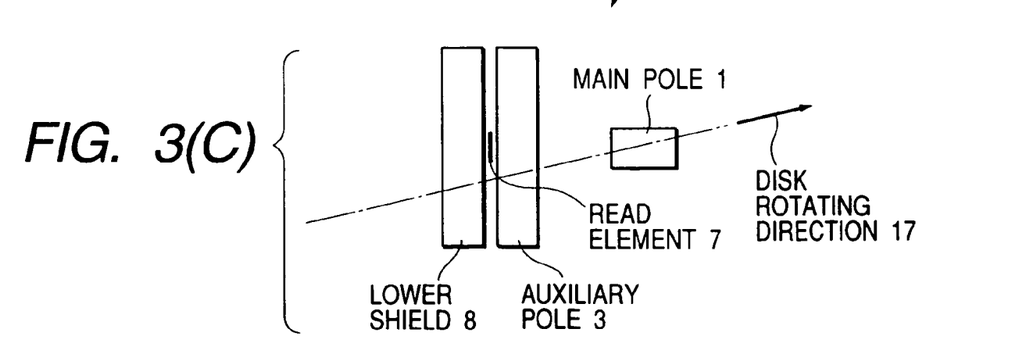
Figure 4:
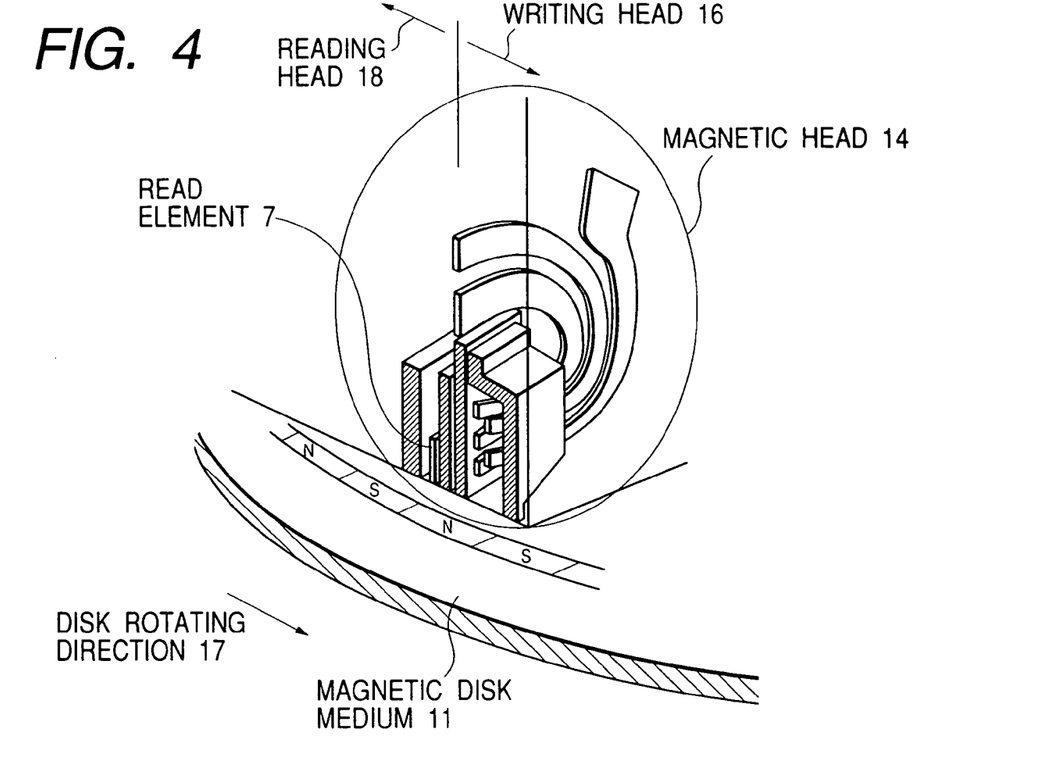
FIG. 4 is a schematic diagram showing the relationship between a magnetic head for perpendicular recording and a magnetic disk in each embodiment of the present invention (wherein the scaling factor is not constant)
Figure 5:
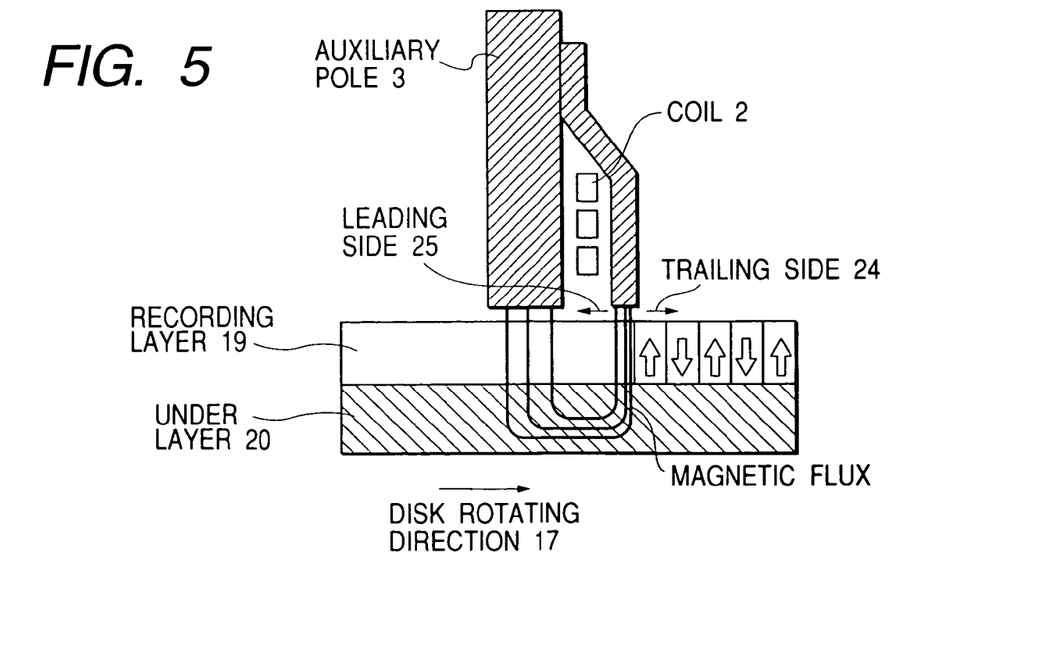
FIG. 5 is a schematic diagram for illustrating perpendicular recording (wherein the scaling factor is not constant)

Below, the present invention will be described by reference to drawings. FIG. 3(A) is a schematic diagram of a magnetic disk storage apparatus utilizing the present invention (wherein the scaling factor of the diagram is not constant). FIG. 3(B) is an enlarged view of a magnetic head slider 13 of FIG. 3(A). FIG. 3(C) is an enlarged view of a magnetic head element 14 of FIG. 3(B). The magnetic disk storage apparatus performs writing and reading of a magnetization signal on a magnetic disk 11 by means of the magnetic head 14 mounted on the slider 13 fixed on the tip of a suspension arm 12. FIG. 4 is a schematic diagram for showing the relationship between a magnetic head for perpendicular recording and a magnetic disk (wherein the scaling factor of the diagram is not constant). FIG. 5 is a schematic diagram for showing perpendicular recording. The magnetic field generated from a main pole forms a magnetic circuit in which the magnetic flux passes through a recording layer and an underlayer, and enters an upper shield 3 which is an auxiliary pole, so that a magnetization pattern is recorded in the recording layer. An intermediate layer may optionally be formed between the recording layer and the underlayer.

Figure 1A:
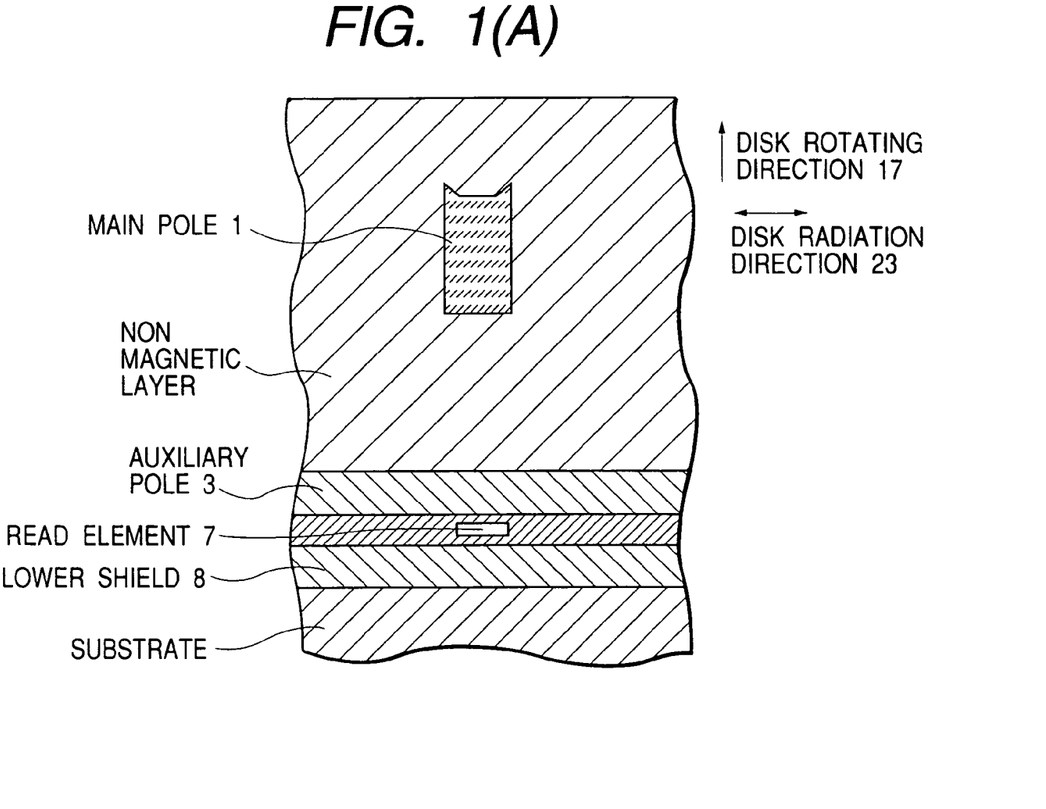
Figure 1B:
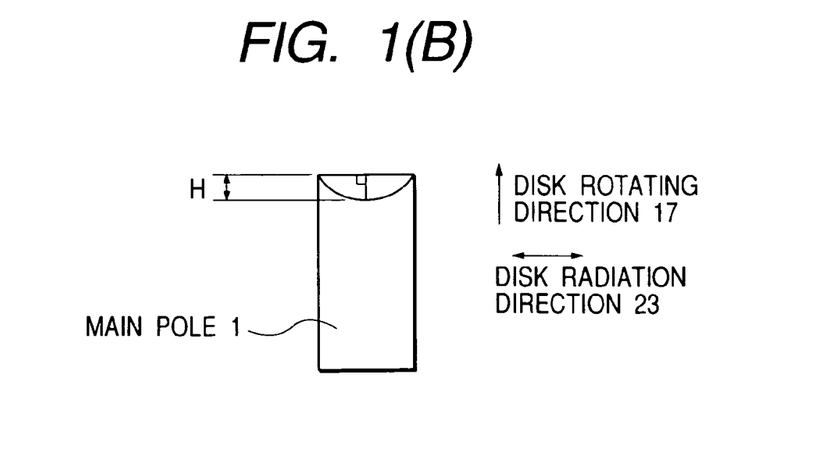
Figure 6A:
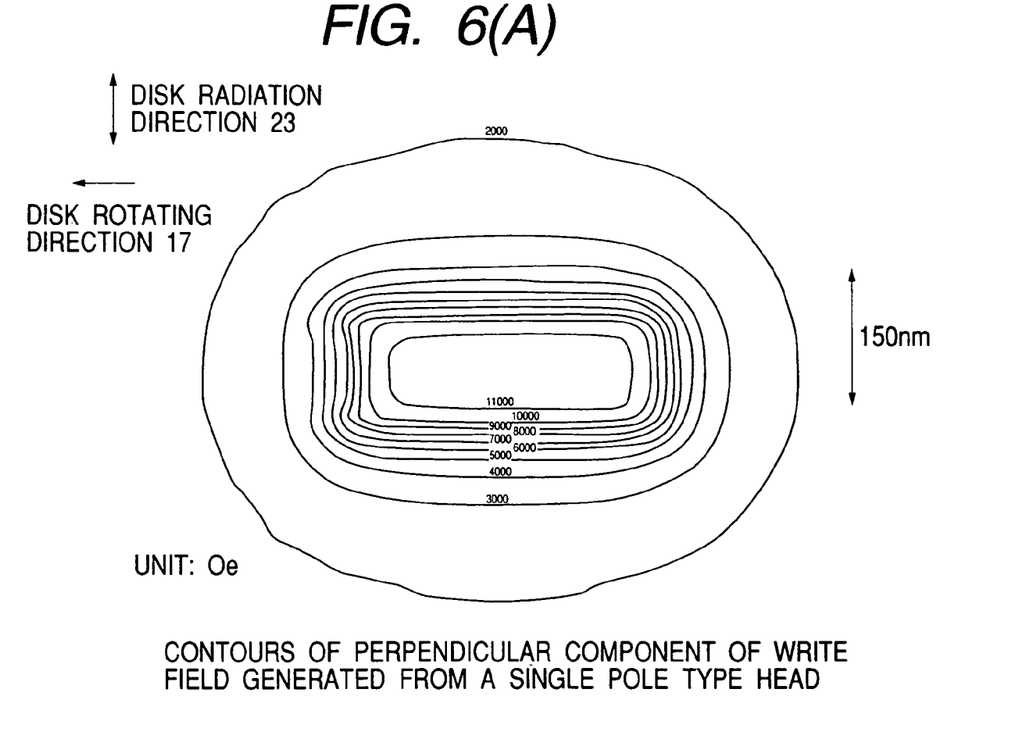
Figure 6B:
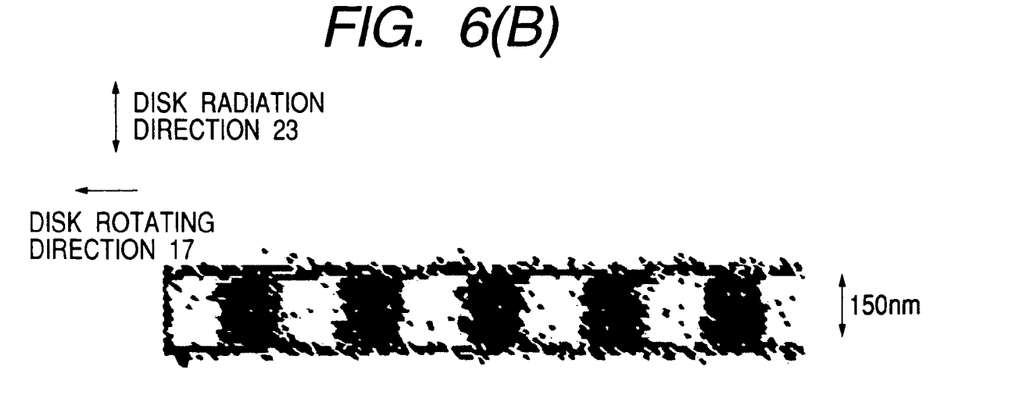
FIG. 6(B) is a diagram for illustrating the recorded magnetization configuration, due to a combination of a single pole type head in accordance with the present invention and a double layered recording medium having an underlayer (wherein the scaling factor is not constant)
Figure 7:
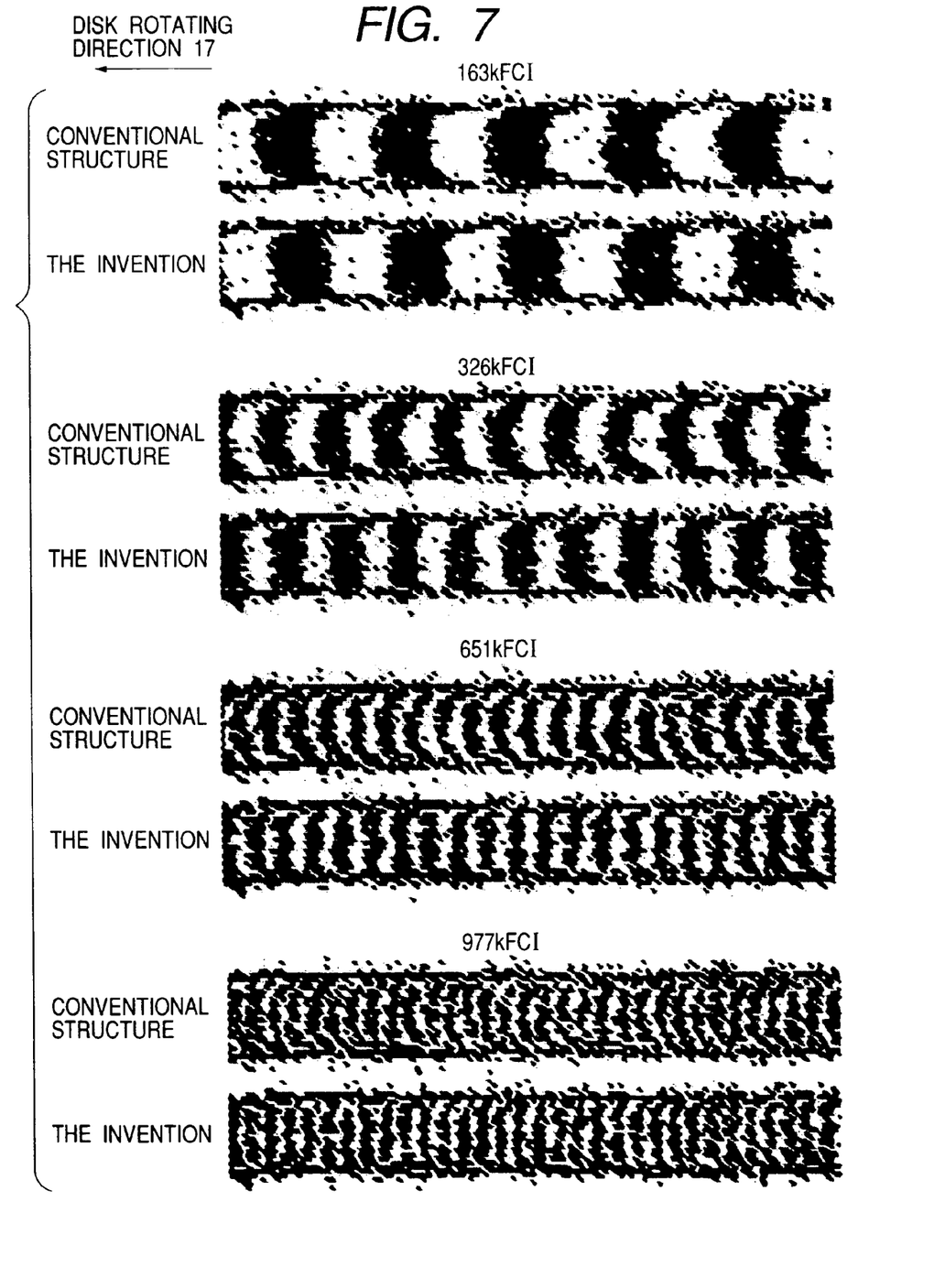
FIG. 7 shows diagrams each for comparing the recorded magnetization configuration between the single pole type head in accordance with the present invention and the single pole type head having a conventional structure (wherein the scaling factor is not constant)

FIG. 1(A) is a schematic diagram of a single pole type head of the present invention as seen from the air bearing surface (the surface opposed to a recording medium) side. The single pole type head of this example is configured as follows. A reading head including a read element is formed on a substrate. Then, a soft magnetic layer which is an auxiliary pole doubling as a magnetic shield is formed thereon. Another soft magnetic layer which is a main pole is formed via a non magnetic layer on the auxiliary pole layer. FIG. 1(B) is a diagram showing the shape of the main pole on the reading head when the single pole type head of the present invention is seen from the air bearing surface. The main pole of FIG. 1(B) has a side in the form of a recess, closer to the trailing side, wherein the trailing side denotes the downstream side of the disk rotating direction. FIG. 6(A) shows the magnetic field distribution of the head in such a shape. As indicated from this figure, the magnetic field distribution on the trailing side has a more linear shape than in the prior-art distribution shown in FIG. 2(A), in other words, the radius of curvature on the leading side becomes larger, so that the gradient of each contour becomes more gentle. Each numeric value in the figure represents the magnetic field intensity of each perpendicular component of write head field in the unit of Oe (oersted). Herein, with the SI system of units, 1 Oe corresponds to 100/4 π(79.6) A/m. Further, FIG. 6(B) is a diagram for showing the medium magnetization configuration obtained by simulation using the magnetic head field distribution of the present invention, and indicates more linearity than in the prior-art state shown in FIG. 2(B). The coercive force of this perpendicular medium is assumed to be 5000 Oe. Thus, the degree of depth of the hollow in the form of a recess is determined so that the magnetic filed intensity equal to the coercive force is distributed linearly. Further, FIG. 7 shows the results of simulation of each medium magnetization configuration by a head having a conventional structure and a head of the present invention when the linear recording density (FCI) has been varied. It is indicated that the head of the present invention provides the magnetization configuration having more straight magnetic transition.

Figure 13:
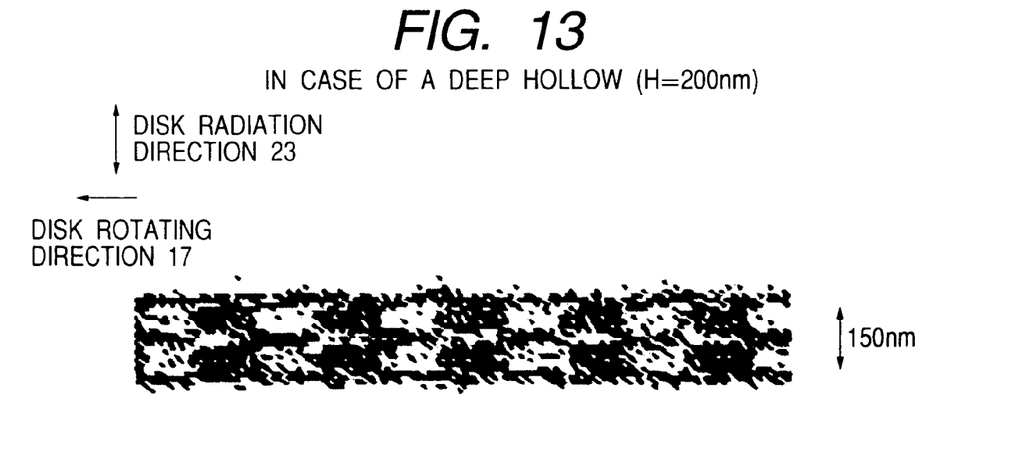
FIG. 13 shows another comparative example in case of a deep hollow.

Further, in this example, the depth of the recess is desirably smaller than the width of the main pole. Herein, in this example, the depth of the recess is defined as the difference in length between each end portion in the track width direction on the trailing side of the main pole wherein the recess is formed and the deepest site of the recess. For example, in FIG. 1, the length "H" corresponds to the depth of the recess. FIG. 13 shows the medium magnetization configuration in the case in which the hollow depth of the recess is 200 nm, which is larger than the track width of 150 nm. Thus, we have found the following fact. Namely, if the degree of hollow depth of the recess form is increased, the magnetic field intensity is decreased, and the magnetic field distribution is disrupted, so that it is not possible to record a straight shape of magnetic transition. Therefore, the length of the normal drawn from the central portion of the side situated on the tailing side of the main pole to the line connecting opposite ends of the side, i.e., "H" shown in FIG. 1 is desirably not more than the track width.

Figure 12:
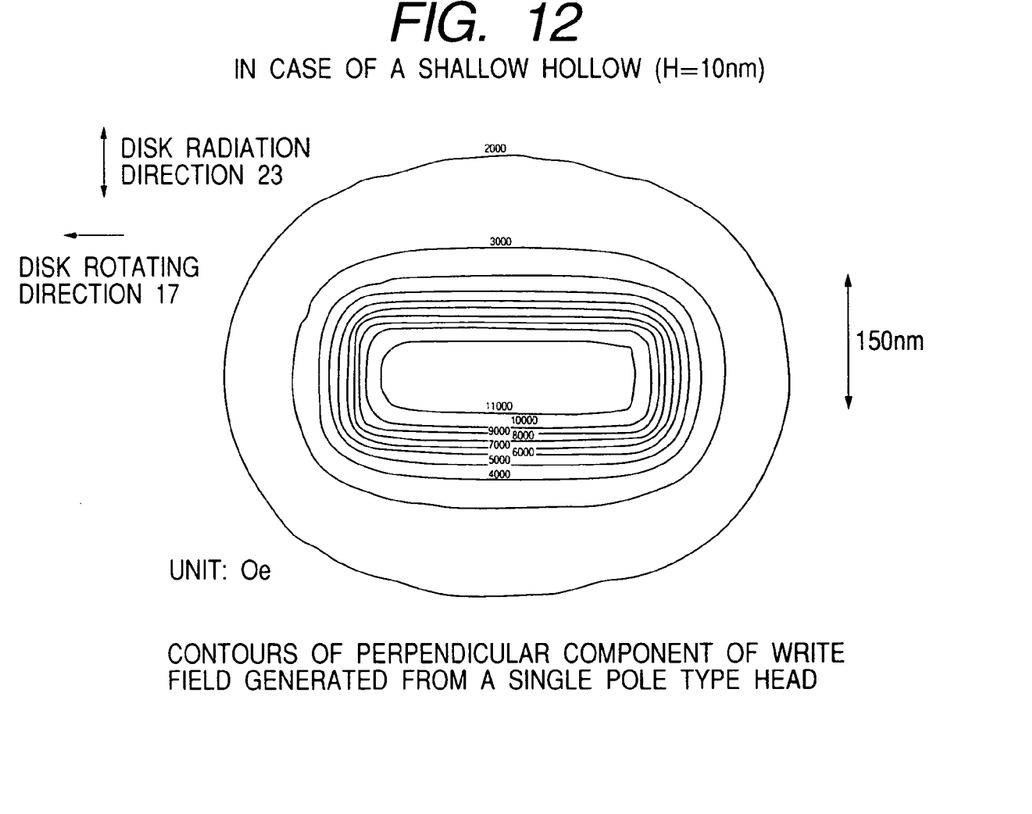
FIG. 12 shows a comparative example in case of a shallow hollow.

Further, we have also found the following fact. Namely, in this example, the depth of the recess is desirably larger than $\frac{1}{10}$ of the width of the main pole, and if the depth of the recess is small, it is not possible to offset the curvature of the shape of magnetic transition. FIG. 12 shows the writing head field distribution when the hollow depth of the recess is 10 nm, which is smaller than $\frac{1}{10}$ of the track width. Since the hollow depth is small, the distribution of contours shows no change as compared with the writing head field distribution shown in FIG. 2(A). Therefore, the length of the normal drawn from the central portion of the side situated on the trailing side of the main pole to the line connecting opposite ends of the side, i.e., "H" shown in FIG. 1 is desirably larger than $\frac{1}{10}$ of the track width.

EXAMPLE 2

Figure 8A:
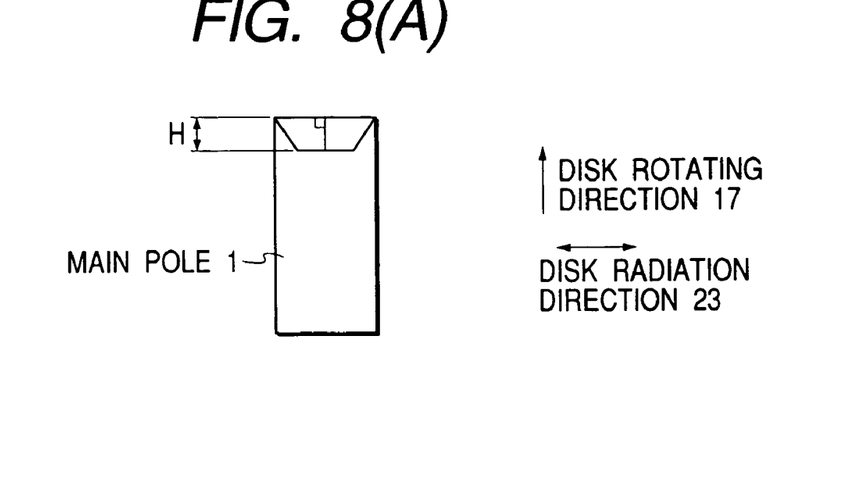
FIGS. 8(A) to 8(C) are diagrams each for showing a portion of the main pole on an enlarged scale in plan view as seen from the air bearing surface of the single pole type head in accordance with the present invention (wherein the scaling factor is not constant)
Figure 8B:
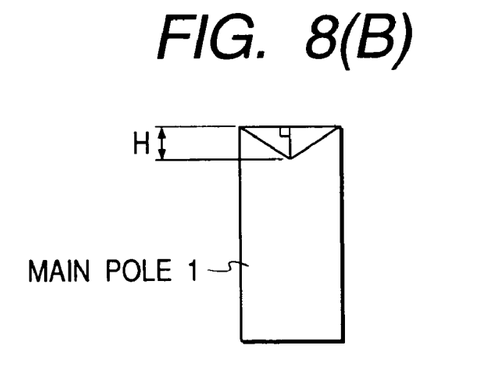
Figure 8C:
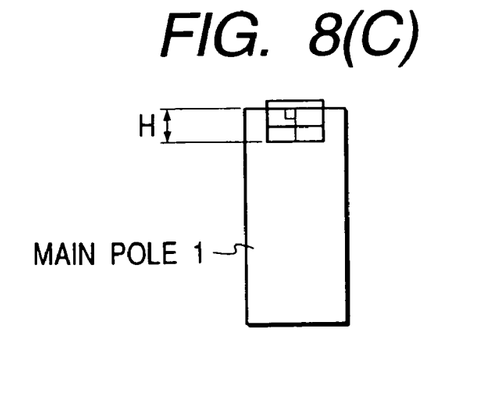

In Example 1, the shape of the recess provided on the trailing side of the main pole has been the shape of a curve. However, the effect of improving the curvature of the shape of magnetic transition can also be obtained even with other shapes. For example, the shape of the recess may also be trapezoid as shown in FIG. 8(A). Alternatively, the shape of the recess may also be triangle or rectangle as shown in FIG. 8(B) or 8(C). The effect of improving the curvature of the shape of magnetic transition can be obtained with any of the shapes shown above. In short, the outline of the main pole as seen from the air bearing surface side includes a first line segment specifying the portion of the outline on the side opposed to the auxiliary pole and a second line segment specifying the portion of the outline on the side opposed to the first line segment. When there are one or more points closer to the first line segment at a midpoint in the second line segment than opposite ends of the second line segment, it can be said that, the requirement that the shape of FIG. 8(A), 8(B), or 8(C) be adopted is satisfied.

EXAMPLE 3

In Example 3, a description will be given to a method for actually manufacturing the main pole having each of the shapes described in Examples 1 and 2.

The invention of this example pertains to a manufacturing method of a single pole type magnetic head for perpendicular recording, characterized by forming a main pole by successively performing the steps of: forming a resist pattern on an inorganic insulating layer; etching the inorganic insulating layer by using the resist pattern as a mask to form a groove; removing the resist pattern; forming a magnetic layer on the inorganic insulating layer; flattening the magnetic layer; and etching the magnetic layer to form a recess.

Figure 9A:
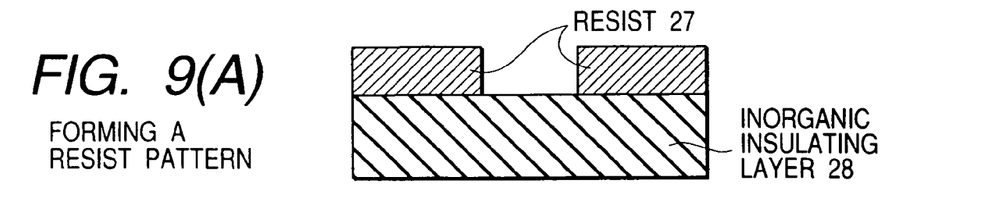
FIGS. 9(A) to 9(G) are schematic diagrams for showing the main pole fabrication process in the embodiment of the present invention (wherein the scaling factor is not constant)
Figure 9B:
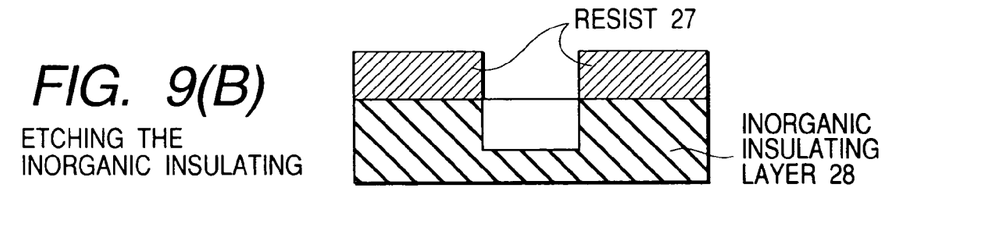
Figure 9C:
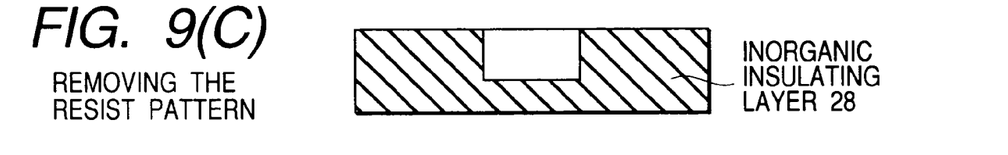
Figure 9D:
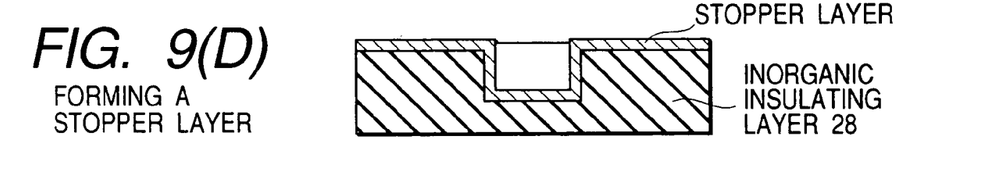
Figure 9E:
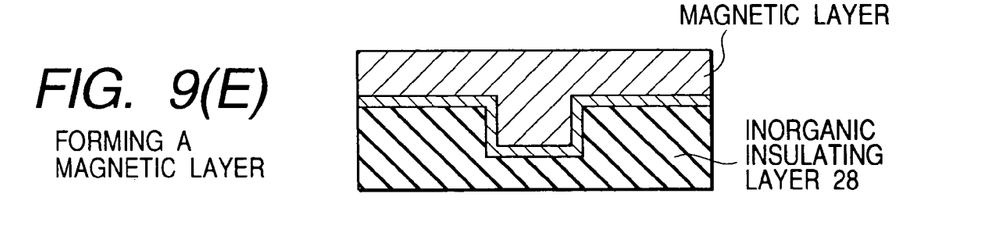
Figure 9F:
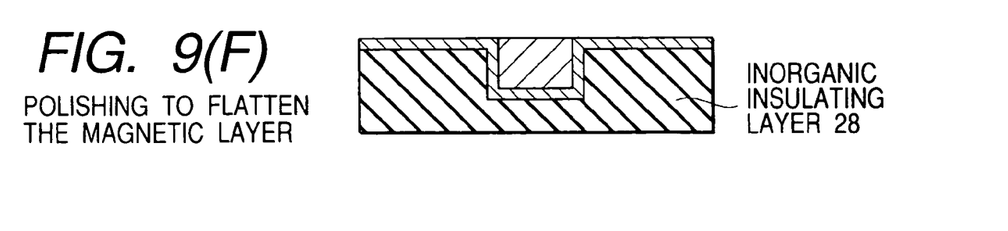
Figure 9G:
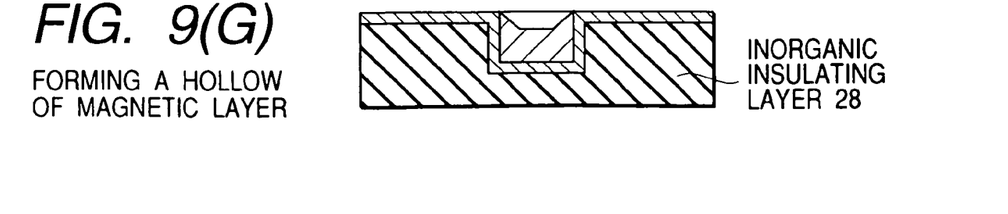

FIGS. 9(A) to 9(G) are schematic diagrams for showing the manufacturing process of the present invention (wherein the scaling factor of each diagram is not constant). FIG. 9(A) shows the state in which the resist pattern has been formed on the inorganic insulating layer. For the inorganic insulating layer, other than $Al_2O_3$ used in the prior art, SiC, AlN, $Ta_2O_5$, TiC, $TiO_2$, $SiO_2$, or the like is usable. FIG. 9(B) shows the state in which the inorganic insulating layer has been etched by using the resist pattern as a mask. When $Al_2O_3$ has been used, a $BCl_3$ gas or a mixed gas of $BCl_3$ and $Cl_2$ may be used as an etching gas. When AlN has been used alternatively, the chlorine gas described above may be desirably used. Further, when $Ta_2O_5$, TiC, $TiO_2$, $SiO_2$, SiC, or the like, which is easy to etch, has been used, a fluoric gas such as a gas of $CHF_3$, $CF_4$, $SF_6$, $C_4F_8$, or the like is usable. FIG. 9(C) shows the state in which the resist has been removed after etching. FIG. 9(D) shows the state in which a stopper layer has been formed. The step shown by this diagram is omittable when the inorganic insulating layer acts as an etching stopper. FIG. 9(E) shows the state in which a magnetic layer has been plated. When an electroplating method is used, $Fe_{55}Ni_{45}$ having a saturated magnetic flux density of 1.6 T, CoNiFe having a saturated magnetic flux density of 2.2 T, or the like can be used. As a seed layer, a magnetic layer having the same composition as that of the plated layer may be used, alternatively, a non-magnetic layer may also be used. FIG. 9(F) shows the state in which the top surface of the magnetic layer has been flattened to form a main pole. Flattening may be accomplished by using a polishing method such as chemical mechanical polishing (CMP), or an etch-back method using ion milling, reactive ion etching, or the like. FIG. 9(G) shows the state in which a hollow of the magnetic layer has been further formed by etching. With this manufacturing method, it is possible to manufacture a magnetic head for perpendicular recording, having a recess on the trailing side, of the present invention.

Figure 10A:
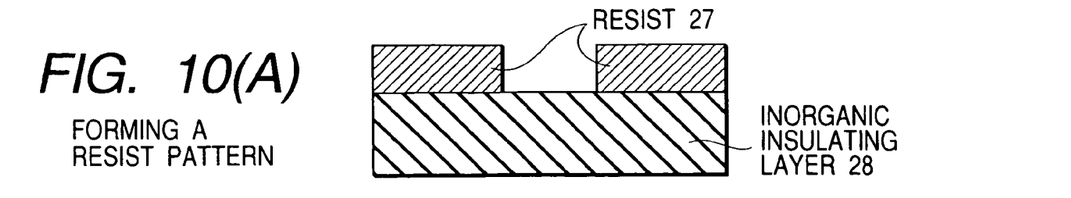
FIGS. 10(A) to 10(G) are schematic diagrams for showing the main pole fabrication process in the embodiment of the present invention (wherein the scaling factor is not constant)
Figure 10B:
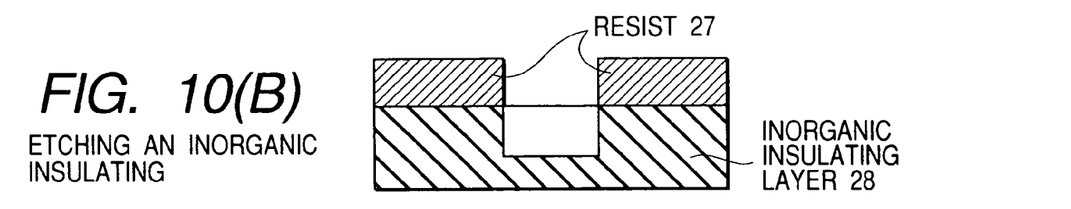
Figure 10C:
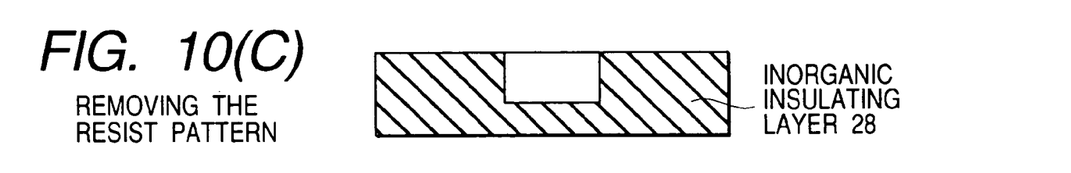
Figure 10D:
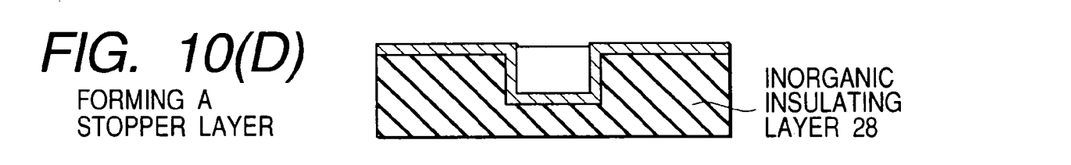
Figure 10E:
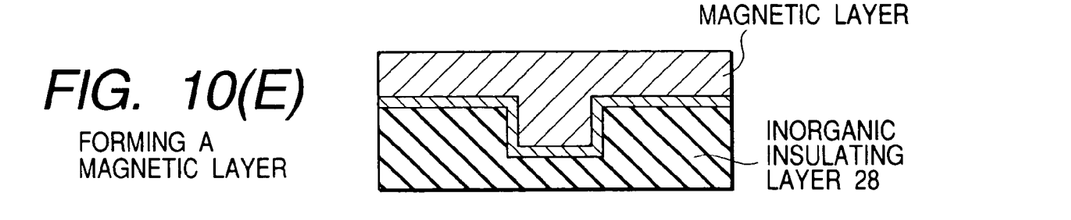
Figure 10F:
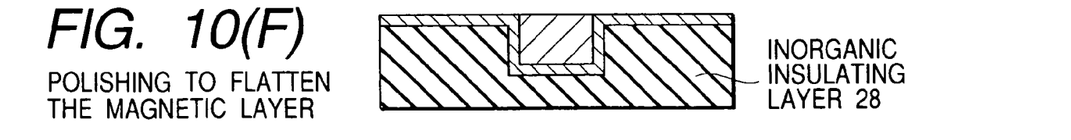
Figure 10G:
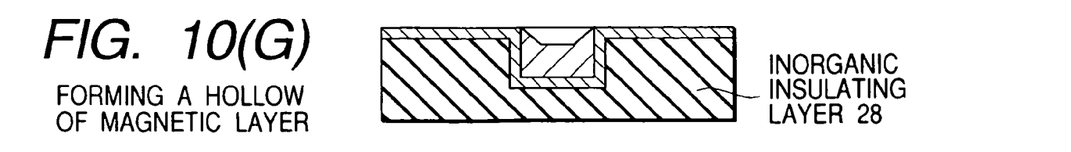

FIGS. 10(A) to 10(G) are schematic diagrams for showing the manufacturing process of the present invention (wherein the scaling factor of each diagram is not constant). The steps of FIGS. 10(A) to 10(F) are the same as those of FIGS. 9(A) to 9(F). FIG. 10(G) shows the state in which a main pole having a recess on the trailing side has been formed. When the main pole has been formed by plating, the central portion of the surface has different film composition and crystalline structure due to the different growth speed of layer. Therefore, if a polishing method such as chemical mechanical polishing (CMP), an etch-back method using ion milling, reactive ion etching, or the like, or an acid treatment is used, it is possible to selectively remove the magnetic layer at the central portion, and thereby, it is possible to form a recess. Incidentally, in the step of flattening of FIG. 10(F), if CMP is carried out intensively, the central portion having different layer composition and crystalline structure is naturally removed. Therefore, the scheme of flattening and groove formation may also be accomplished by only CMP.

Figure 11A:
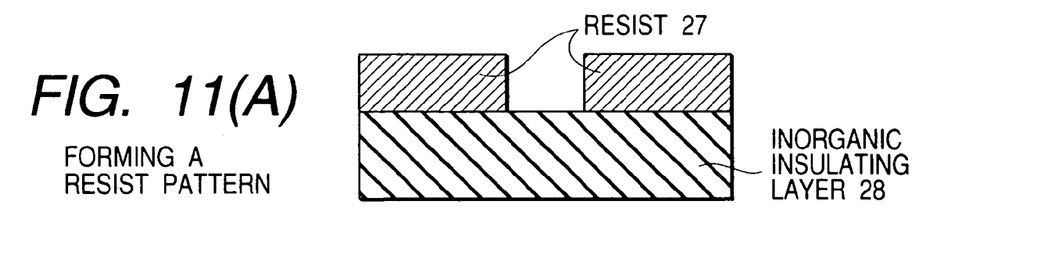
FIGS. 11(A) to 11(D) are schematic diagrams for showing the main pole fabrication process in the embodiment of the present invention (wherein the scaling factor is not constant)
Figure 11B:
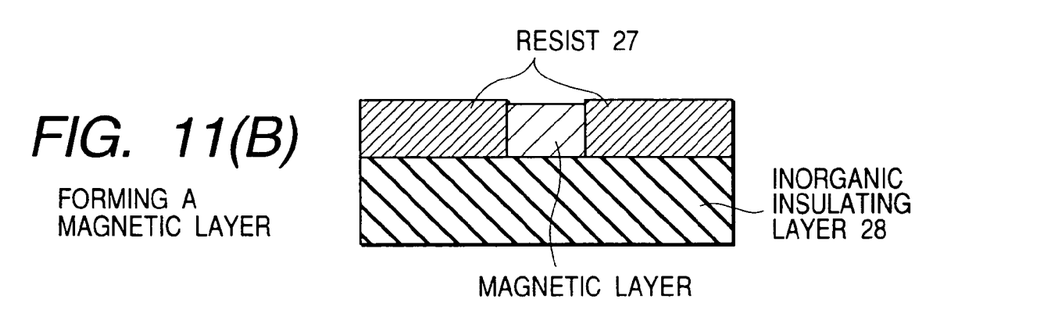
Figure 11C:
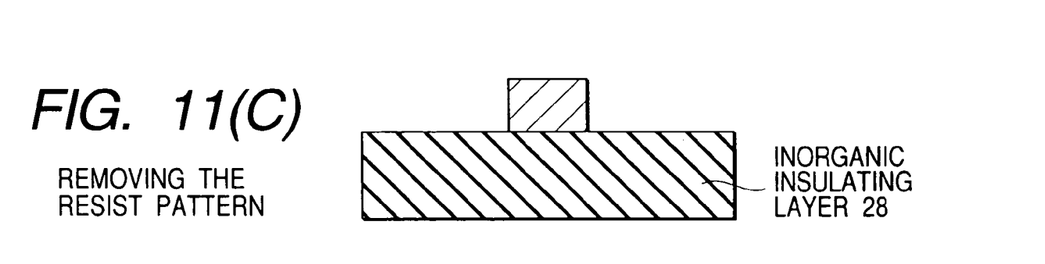
Figure 11D:
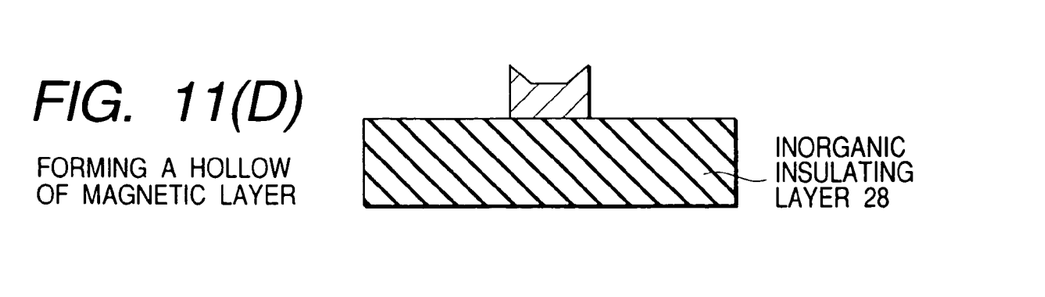

Further, FIGS. 11(A) to 11(D) are schematic diagrams for showing another manufacturing process of the present invention (wherein the scaling factor of each diagram is not constant). FIG. 11(A) shows the state in which the resist pattern has been formed on the inorganic insulating layer. For the inorganic insulating layer, other than $Al_2O_3$ used in the prior art, SiC, AlN, $Ta_2O_5$, TiC, $TiO_2$, $SiO_2$, or the like is usable. FIG. 11(B) shows the state in which a magnetic layer has been plated. When an electroplating method is used, $Fe_{55}Ni_{45}$ having a saturated magnetic flux density of 1.6 T, CoNiFe having a saturated magnetic flux density of 2.2 T, or the like can be used. As a seed layer, a magnetic layer having the same composition as that of the plated layer may be used, alternatively, a non-magnetic layer may also be used. FIG. 11(C) shows the state in which the resist has been removed. FIG. 11(D) shows the state in which a hollow of the magnetic layer has been further formed by ion milling. With this manufacturing method, it is possible to manufacture a magnetic head for perpendicular recording, having a recess on the trailing side, of the present invention.

EXAMPLE 4

The invention described in this example pertains to a magnetic head slider mounting a single pole type read/write head including a writing head having a main pole and an auxiliary pole and a magnetoresistive read element, wherein a recess is provided on the side of the main pole closer to the side of air outflow. The outline of the magnetic head slider of this example is shown in FIGS. 3(A) to 3(C). A main pole 1 in an enlarged view of a portion indicated as a magnetic head 14 is provided with a recess on its side closer to the side of air outflow of the magnetic head slider. The provision of the recess in the main pole provides an effect of improving the curvature of the shape of recorded magnetic reversal.

EXAMPLE 5

The invention described in this example pertains to a head assembly including a magnetic head slider mounting a single pole type read/write head including a writing head having a main pole and an auxiliary pole and a magnetoresistive read element, a gimbal for supporting the magnetic head slider, and a suspension arm for fixing the gimbal, wherein a recess is formed on the side of the main pole opposite to the fixing point with the gimbal and the suspension arm.

The outline of the head assembly of this example is a combination of a suspension arm 12 and the magnetic head slider shown in FIGS. 3(A) and 3(B). The gimbal is bonded to the tip of the suspension arm 12, which is not shown. Therefore, the gimbal is a separate component from the suspension arm. However, it may also be integrally formed on the tip of the suspension arm 12 in one piece.

EXAMPLE 6

The invention described in this example pertains to a magnetic disk storage apparatus which includes a double layered perpendicular magnetic recording medium, a single pole type read/write head, and a driving unit for rotatably driving the recording medium in a given direction, wherein a recess is formed on the downstream side of the direction of rotation of the main pole when the main pole is seen from the air bearing surface side. The apparatus is capable of recording a bit without curving the shape of magnetic reversal, and hence it does not entail the following problems: when the recorded bit is read by the reading head, the magnetic reversal width appears to be large, so that the half-width of an isolated pulse is increased, and at the same time, the recording track width is narrowed with an increase in linear recording density. Further, it is possible to manufacture a magnetic disk storage apparatus having an improved S/N ratio in accordance with the improvement of the shape of recorded magnetization pattern.

Further, in the case where both sides of the magnetic recording medium are used, or in a magnetic disk storage apparatus using a plurality of magnetic recording media, a plurality of magnetic heads are used. Also in such a case, it is considered that the S/N ratio of the overall apparatus is improved by configuring at least one of the main poles of a plurality of the magnetic heads as described above.

By forming the trailing side of the air bearing surface of the main pole in the shape of a recess, it is possible to linearize the magnetic field distribution whereby the magnetic transition is determined. In consequence, the apparatus is capable of recording a bit without curving the shape of magnetic reversal. As a result, it is possible to provide a magnetic head for perpendicular recording which does not entail the following problems: when reading is performed by the magnetoresistive head, the magnetic transition width appears to be large, so that the half-width of an isolated pulse is increased, and at the same time, the recording track width seems to be decreased with an increase in linear recording density. Further, it is possible to obtain a magnetic disk storage apparatus using the same.

What is claimed is:

1. A method for manufacturing a single pole type magnetic write head including a main pole and an auxiliary pole, comprising the steps of:
    forming an inorganic insulating layer;
    forming a groove in the inorganic insulating layer;
    forming a magnetic layer serving as a main pole of the write head in the groove; and
    forming a recess in the magnetic layer on a trailing side of an air bearing surface thereof,
    wherein an outline of the main pole as seen from the air bearing surface side has a first line segment opposed to the auxiliary pole and a second line segment opposed to the first line segment, and the second line segment has one or more points closer to the first line segment than opposite ends of the second line segment; and
    wherein the recess is formed by ion milling.

2. The method for manufacturing a single pole type magnetic head according to claim 1, wherein the recess is formed by removing a part of the magnetic layer with any one of the following methods of CMP, acid treatment, and RIE.

3. The method for manufacturing a single pole type magnetic head according to claim 1, wherein the step of forming a groove in the inorganic insulating layer includes a step of forming a resist pattern on the inorganic insulating layer and the step of performing etching using the resist pattern as a mask.

* * * * *